(12) United States Patent
Hukelmann

(10) Patent No.: US 10,370,202 B2
(45) Date of Patent: Aug. 6, 2019

(54) SUCTION GRIPPER AND METHOD FOR GRIPPING ELASTIC SLICES

(71) Applicant: Deutsches Institut fuer Lebensmitteltechnik e.V., Quakenbrueck (DE)

(72) Inventor: Bernhard Hukelmann, Quakenbrueck (DE)

(73) Assignee: Deutsches Institut fuer Lebensmitteltechnik e.V, Quakenbrueck (DE)

( * ) Notice: Subject to any disclaimer, the term of this patent is extended or adjusted under 35 U.S.C. 154(b) by 0 days.

(21) Appl. No.: 15/691,356

(22) Filed: Aug. 30, 2017

(65) Prior Publication Data

US 2018/0057285 A1 Mar. 1, 2018

(30) Foreign Application Priority Data

Aug. 30, 2016 (DE) .......................... 10 2016 216 349

(51) Int. Cl.
| | |
|---|---|
| *B25J 15/06* | (2006.01) |
| *B65G 59/04* | (2006.01) |
| *B65G 47/91* | (2006.01) |

(52) U.S. Cl.
CPC .......... *B65G 59/04* (2013.01); *B25J 15/0616* (2013.01); *B65G 47/91* (2013.01)

(58) Field of Classification Search
CPC ....... B65G 59/04; B65G 47/91; B25J 15/0616
USPC .................................. 294/183, 64.2, 64.3, 65
See application file for complete search history.

(56) References Cited

U.S. PATENT DOCUMENTS

| | | | |
|---|---|---|---|
| 3,595,562 A | 7/1971 | Oldroyd | |
| 4,690,393 A | 9/1987 | Engle | |
| 7,281,739 B2 * | 10/2007 | Kniss | ...................... B25J 13/086 294/65 |
| 7,309,089 B2 * | 12/2007 | Perlman | ................ B25B 11/005 294/189 |
| 8,251,415 B2 * | 8/2012 | Lomerson, Jr. | ...... B25J 15/0616 294/2 |
| 8,560,121 B2 * | 10/2013 | Hjornet | ................ B25J 15/0616 198/468.4 |
| 2001/0046435 A1 | 11/2001 | Gibbel | |
| 2012/0280526 A1 * | 11/2012 | Lin | ...................... B25J 15/0061 294/183 |

FOREIGN PATENT DOCUMENTS

| | | |
|---|---|---|
| DE | 9103983 U1 | 6/1991 |
| DE | 102006022277 A1 | 11/2007 |

(Continued)

OTHER PUBLICATIONS

Benoit Martin, EP Search Report for Application No. 17188651.8, dated Jan. 16, 2018.

*Primary Examiner* — Stephen A Vu
(74) *Attorney, Agent, or Firm* — Greer, Burns & Crain, Ltd.; Steven P. Fallon

(57) ABSTRACT

The invention describes a suction gripper for elastic slices sticking to each other, such as slices of food. The suction gripper has a suction cup, to which reduced pressure is applied in a controlled manner. The suction gripper is characterized by a tube, which projects at least into the plane of the suction opening of the suction cup, optionally projects over the plane of the suction opening, and to which pressured gas may be applied.

29 Claims, 4 Drawing Sheets

(56) References Cited

FOREIGN PATENT DOCUMENTS

| | | |
|---|---|---|
| DE | 102011012880 A1 | 4/2012 |
| DE | 102013009344 A1 | 12/2014 |
| DE | 102014204293 A1 | 9/2015 |
| EP | 2842703 B1 | 3/2016 |
| GB | 2062585 A | 5/1981 |
| JP | 2015062939 A | 4/2015 |
| JP | 2015062940 A | 4/2015 |

* cited by examiner

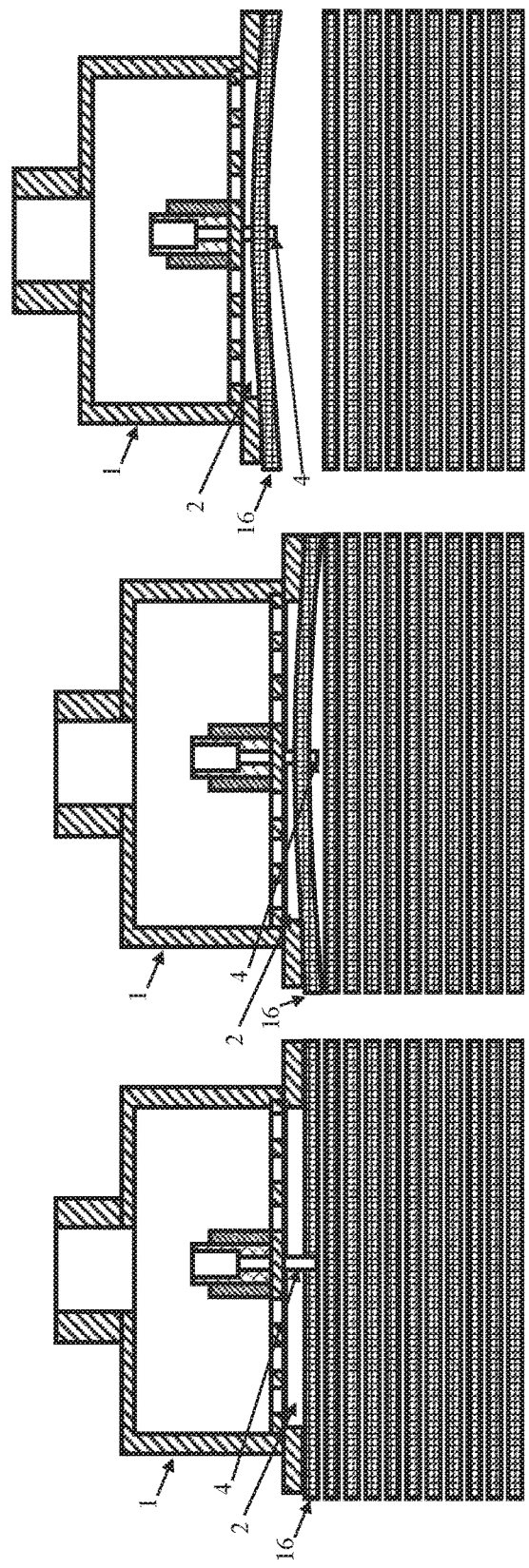

SUCTION GRIPPER AND METHOD FOR GRIPPING ELASTIC SLICES

PRIORITY CLAIM

This application claims the priority of the German patent application 10 2016 216 349, filed on 30 Aug. 2016.

FIELD OF THE INVENTION

The present invention relates to a suction gripper which is especially suited for use as a gripper for elastic slices and/or as a separating device for elastic slices from a stack of slices, as well as to a process for gripping and separating elastic slices from a stack of slices, especially by means of the suction gripper.

The suction gripper and the process allow picking up an elastic slice from a stack of slices, even when the slices stick to each other. Preferably, the slices are food slices, e.g. protein and fat containing slices of food having a moist surface, especially slices of sausage or cheese. The invention also relates to a process for the production of composite food, in which at least one elastic slice, especially exactly one slice, of food is separated from a stack of slices and moved, whereby the slice becomes a component of the food.

STATE OF THE ART

EP 2842703 B1 describes a blow-off pipe arranged inside the suction cup of a suction gripper, which may end in the plane of the opening of the suction cup and may be connected to a source of compressed air.

Elastic slices of food sticking to each other are known to be picked up from a stack of slices by hand directly or using a cutlery.

Problem of the Invention

The problem underlying the invention is to provide an alternative device and an alternative process for gripping and separating elastic slices from a stack of slices, which preferably is automatable.

DESCRIPTION OF THE FIGURES

The invention will now be illustrated in more detail with reference to the figures which schematically show in
 FIG. 1 a cutaway view of a suction gripper;
FIGS. 3A-3C the process.

DESCRIPTION OF THE INVENTION

Figure 1:
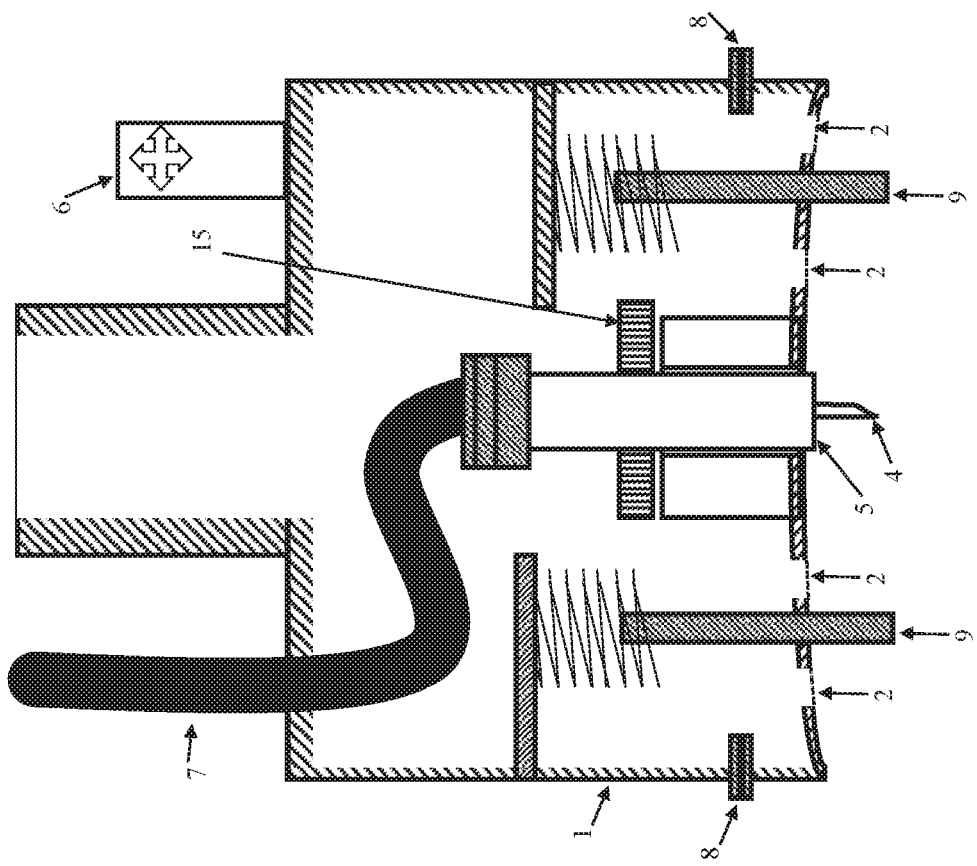

The invention solves the problem with the features of the claims, especially with a suction gripper, which is especially usable as a separation device for elastic slices, which preferably stick to each other, such as slices of food. The suction gripper has a suction cup, which is connectable to a source of reduced pressure for controlled application of reduced pressure. The suction cup has a suction opening, which is surrounded by the suction cup, optionally at least two suction openings, which are surrounded by the suction cup. The at least one suction opening may be arranged in the suction cup in-plane, or in an at least partially cylindric wall.

The suction cup may be realized as a device to be guided by hand, for example for use as a separation and transport device for slices of food, which are taken off from a stack and moved as a part of food to a portion of that food, and combined. The suction cup optionally is mounted on a moving device, for example a robot arm, which is controlled to move the suction cup in relation to a carrier and/or a stack of slices into a first position and into a second position spaced therefrom. Preferably, the device comprising the suction gripper has a carrier for carrying the stack of slices, from which a slice, especially exactly one or a specific number of slices, is to be picked up. The second position is the one, in which the slice picked up by the suction gripper is put down, for example during the preparation of a composite food on a portion of this food. The suction gripper thus may have a moving device, which is controlled to move the suction cup into a first position, in which the suction cup is arranged at a distance from the carrier, which is filled with a stack of slices. Therein, the stack of slices is arranged, for example, on a carrier, which is arranged in the first position, and the second position is located relative to the carrier at a distance from the first position.

The source of reduced pressure may be a device for generating reduced pressure, which preferably is driven by a pressured gas.

The suction gripper is characterized by a tube, which projects at least up into the plane of the suction opening, optionally projects over the plane of the suction opening, and can be subject to the application of pressured gas. The tube is hollow and adapted to conduct pressured gas in a controlled manner. For controlled guidance of pressured gas, the tube may be connected to a supply line for pressured gas, with a valve being arranged in the supply line. The valve may be operable manually or automatically. During the process, this tube allows pressing pressured gas into the region where two slices contact each other, especially the uppermost slice of a stack and the adjacent slice, for example between the uppermost slice of a stack and the adjacent slice. This pressing of pressured gas between two slices leads to a partial separation of the slices contacting each other, in which procedure the uppermost slice may move into the suction opening when the suction opening contacts the stack of slices. When applying reduced pressure to the suction cup, the partial separation of the two slices leads to sucking in of only those slices, which are at least partially separated from the other slices by the pressured gas pressed in, especially only of the one uppermost slice.

Generally preferred the suction gripper is adapted such that the end of the tube projects through the uppermost slice or is pushed through the uppermost slice, when the suction cup is laid on the stack of slices, so that the tube ends between the uppermost and the adjacent slice, and the pressured gas can be pressed through the tube between the uppermost slice and the adjacent slice. The suction gripper, which is suitable for use as a separation device for elastic slices from a stack of slices is provided with a suction cup having at least one suction opening, and with a tube connected in a controlled manner to a source of pressured gas, which tube projects at least into the plane of the suction opening, with the suction cup being connected in a controlled manner to a source of reduced pressure, and with the tube projecting over the plane of the suction opening by the thickness of at least one slice or by the thickness of exactly one slice, e.g. 0.2 to 10 mm.

Additionally, or in the alternative to the tube projecting over the plane of the suction opening by the thickness of a slice, the tube may have a mechanical stop in the plane of the suction opening, with the tube projecting over the mechanical stop by the thickness of at least one slice or by the thickness of exactly one slice, e.g. 0.2 to 10 mm.

Advantageously, the suction cup is arranged adjacent to the suction opening in-plane, so that the suction opening is surrounded by a rim in-plane, so that the rim completely circumferentially lies against the uppermost slice, when the suction cup is moved into the first position or is arranged against the slice.

It turned out that by means of a tube resting on the uppermost slice of food, pressured gas can be pressed through the same between the uppermost and the adjacent slice of food. Presently, this is attributed to a sufficient permeability of some slices of food to pressured gas, e.g. slices of salami. Thus, the tube may end in the plane of the suction opening, the suction gripper preferably being arranged to apply pressured gas to the tube and to apply in a controlled manner reduced pressure to the suction cup afterwards with a time delay.

Alternatively, the tube may project over the plane of the suction opening, so that the tube is pushed through the uppermost slice when the suction cup is moved into the first position, especially while the suction cup lies against the uppermost slice, so that the ending of the tube is arranged below the uppermost slice, especially between the uppermost and the adjacent slice. The ending of the tube may be beveled. This is advantageous insofar as the ending touches the interface, where two slices contact each other, and introduces pressured gas into this region, so that these two slices are partially separated.

Preferably, the tube has a mechanical stop extending away from the circumference of the tube, and in the embodiment, in which the tube is to rest on the uppermost slice, it is flush with the mechanical stop, or in the embodiment, in which the tube is pushed through the uppermost slice, it projects over the mechanical stop, especially by the thickness of the one slice or the number of the slices being picked up from the stack and moved into the second position.

The suction gripper preferably has a control unit adapted to apply pressured gas to the tube when the suction cup is in the first position. The control unit is also adapted to apply reduced pressure to the suction cup when the suction cup is in the first position, so that the slice, which is partially separated from the adjacent slice by the pressed-in pressured gas, is sucked in by the suction cup. Therein, the control unit may be adapted to apply pressured gas to the tube and to apply reduced pressure to the suction cup only after a time delay, e.g. from 10 to 100 ms. Alternatively, the control unit may be adapted to apply pressured gas to the tube and, simultaneously, reduced pressure to the suction cup. This is because it turned out that slices of food are partially separated from each other by the pressured gas, when pressured gas is pressed into the interface layer between two slices contacting each other, before the pressured gas is sucked through the uppermost slice of food by the reduced pressure. Furthermore alternatively, the control unit may be adapted to apply pressured gas to the tube only with a time delay, e.g. from 10 to 100 ms, after the application of reduced pressure to the suction cup. This alternative is advantageous insofar as due to the reduced pressure the suction cup contacts the uppermost slice, for example with its rim surrounding the suction opening.

Generally, the control unit may be triggered or controlled by a manual signal, for example by a manually operated switch, which especially is a pressure switch, for applying pressured gas to the tube and applying reduced pressure to the suction cup, or depending on the position of the suction cup in the first or second position.

In the embodiment, in which the tube ends in the plane of the suction opening, it may have a cross section of e.g. 1 to 20% of the cross-sectional area of the suction openings. In the embodiment, in which the tube projects over the plane of the suction opening, the tube may have a cross section of e.g. 0.5 to 2 mm, e.g. 0.9 mm.

Preferably, the tube is fixed inside of the suction cup, optionally with an adjustment device for adjusting the tube, in order to move its ending into the plane of the suction opening or beyond the plane of the suction opening, and to fix it. Such an adjustment device is preferably adapted to move the tube into a position, in which the ending of the tube lies in the plane of the suction opening or projects over the plane of the suction opening only when pressured gas is applied, and to move the tube back, especially into the suction cup, when an application of pressured gas is absent. The adjustment device may be, for example, a pneumatic cylinder, which acts against a spring and upon application of pressured gas shifts the tube, until its ending lies in the plane of the suction opening or projects over the plane of the suction opening. The suction gripper may thus be adapted such that the tube, when pressured gas is applied to the same, is movable by means of the adjustment device into a position, in which the ending of the tube lies in the plane of the suction opening or projects over the plane of the suction opening, with or without a mechanical stop on the tube, and in the absence of an application of pressured gas the tube is movable back from this position, for example is spring-loaded into this position. Preferably, the pneumatic cylinder is connected to the same source of pressured gas and to the same control unit as the tube and to it the same pressured gas is applied or is simultaneously applied as to the tube.

It is generally preferred to move the moving device in a controlled manner into the second position after the application of reduced pressure to the suction cup and after the application of pressured gas to the tube. After moving the suction cup from the first position, pressured gas may still be applied to the tube, preferably the pressured gas then is turned off under the control of the control unit.

In the second position, the reduced pressure is preferably removed, for example by turning off or separating the source of reduced pressure from the suction cup, or by opening a ventilation hole in the suction cup.

The pressured gas may be a protective gas, e.g. $CO_2$ and/or nitrogen, in order to reduce or inhibit microorganisms and changes of the slices of food.

The moving device preferably is a robot arm driven in a program-controlled manner to move from the first into the second position, or a positioning device guided on a frame.

It is generally preferred that the suction gripper is connected to a camera and a computer-controlled positioning device for the moving device, which are adapted to determine the position of the uppermost slice of a stack of slices and to move the suction cup into the first position, and are adapted to subsequently move the suction cup into the second position.

The suction cup may have two or more suction openings, which, for example, may be surrounded by a common rim. Two or more suction openings may be arranged in-plane or in a concave or convex surface.

Two or more suction openings may be arranged in a concave surface. Alternatively, two or more suction openings may be arranged in a convex surface, which at least partially is a cylinder wall, e.g. comprises up to 180° or up to 90° or up to 45° of the cylinder wall around the cylinder axis. Such a suction cup preferably is mounted on a moving device and is rotatable thereon around its cylinder axis, optionally rotatingly driven, and guided in the first position perpendicularly to the cylinder axis, in order to carry out a rolling motion of the suction openings along the first position or along the slice arranged in the first position.

To two or more suction openings, which are arranged in a convex surface, reduced pressure is applied in a controlled manner, preferably depending on the position of the suction cup, especially depending on the rotation of the convex surface around its cylinder axis. In order to control the application of reduced pressure to the suction openings, the suction openings may be closed by a cover, which covers a section of the convex surface depending on its rotation around the cylinder axis, or by valves.

Generally, an ejector may be arranged adjacent to a suction opening or in or above a suction opening, which ejector is moved against the suction cup when reduced pressure is applied, for example is spring-loaded, for example by a sucked-in slice, and moves above the plane of the suction opening when the reduced pressure is turned off. Alternatively to a mechanical ejector, which is spring-loaded against a sucked-in slice or against the opening of the suction cup, the ejector may be a pressured gas supply, which is controllable, for example manually or by a control device, in order to let pressured gas stream into the suction cup when the suction cup is in the second position.

It is generally preferred that the suction cup is provided with a device for generating low pressure, which is driven by pressured gas, e.g. compressed air. Such a device may be, for example, a Venturi nozzle driven by pressured gas or an ejector pump, which sucks in air by means of the driving pressured gas and thus creates reduced pressure. An ejector pump may be, for example, one that works according to the Venturi principle or according to the Bernoulli principle.

In embodiments, in which the tube and the device for generating low pressure and/or an ejector may be subject to the application of pressured gas, the suction gripper preferably has only one connection for a common pressured gas duct.

The tube may be shiftably guided on the suction cup, preferably with a drive, which moves the tube into the plane of the suction opening or beyond, when pressured gas is applied, the drive being spring-loaded in the opposite direction, so that without pressured gas being applied the tube is moved behind the plane of the suction opening, preferably into the suction cup.

Preferably, the tube is centrally arranged in a suction opening. Optionally, the suction cup has two or more tubes, which are spaced from one another, preferably parallelly to each other, and extend to the same extent in relation to the plane of the suction opening, in which they are arranged.

The process according to the invention may be a step in the production of composite food, for example of baked goods filled with slices, especially bread, pizza, cakes, hamburger, sandwiches and/or ready-made sandwich fillings of at least two slices, e.g. Cordon bleu and the like.

The process, especially with the suction gripper according to the invention, is characterized in that through a tube pressured gas is pressed between two slices, especially between the uppermost slice of a stack and the adjacent slice. The pressured gas pressed between two slices causes a partial separation of the two slices, so that the slice adjacent to the suction cup, which is the uppermost slice, is singly sucked to the suction cup due to the reduced pressure, whereas the adjacent slice remains adhered to the remaining stack.

For a stack of slices, the uppermost slice of which is in a first position, the suction cup with its at least one suction opening is moved into a first position, in which the suction opening contacts the uppermost slice or lies against the first position. In the first position the tube, which extends into the plane of the suction opening, is positioned with its ending adjacent to the uppermost slice, or a tube, which extends over the plane of the suction opening, is pushed or stuck through the uppermost slice, so that its ending discharges below the uppermost slice, preferably between the uppermost and the adjacent slice. When pressured gas is applied to the tube, the pressured gas passes through the uppermost slice when the ending of the tube is resting on the uppermost slice or the pressured gas is pressed directly between the uppermost and the adjacent slice.

After moving the suction cup with its at least one suction opening into the first position, in which the suction opening lies against the stack of slices, pressured gas is applied in a controlled manner to the tube in the first position, which tube projects at least into the plane of the suction opening, and reduced pressure is applied to the suction cup in the first position. The application of reduced pressure to the suction cup may be carried out before, simultaneously with or after the application of pressured gas to the tube, preferably at least until the application of reduced pressure to the suction cup, more preferably at least until moving the suction cup from the first position. The application of pressured gas to the tube and the application of reduced pressure to the suction cup is carried out in a controlled manner by a control unit, especially depending on the movement of the suction cup into the first position and/or depending on the positioning of the suction cup in the first position.

Subsequently, the suction cup is moved into a second position, while reduced pressure is applied to the suction cup until the second position is reached. In the second position, the reduced pressure is removed in order to drop the slice from the suction cup. Generally preferred the opening of the suction cup can be horizontally arranged in the first position and in the second position, and the slice lies horizontally in the first position.

The application of pressured gas to the tube may be terminated as soon as reduced pressure is applied to the suction cup after the application of pressured gas to the tube. After application of reduced pressure to the suction cup, pressured gas may thus no longer be applied to the tube, or the application of pressured gas to the tube may be terminated after application of reduced pressure to the suction cup. Alternatively, pressured gas may continuously be applied to the tube, especially in the embodiment, in which the ending of the tube is resting on the slice, until the reduced pressure applied to the suction cup is terminated in the second position. In the embodiment, in which the ending of the tube is resting on the slice, the pressured gas may generally be turned off when the suction cup is moved from the first position and, optionally, pressured gas may be applied to the tube in the second position, when the reduced pressure applied to the suction cup is turned off in the second position. The pressure gas then serves to support dropping of the slice sucked-in by the suction cup, when the reduced pressure is turned off. During dropping the slice in the second position of the suction gripper, an ejector, which especially is articulated on the rim of the suction opening and/or projects over the suction opening, may load the slice in the direction away from the suction cup. Preferably, the ejector is spring-loaded in the direction away from the suction cup.

In embodiments of the suction cup with at least two suction openings, reduced pressure is applied to them one after the other in a controlled manner, preferably depending on the position of the suction cup in the first or second position. For example, when moving the suction cup into the first position and/or rotating a suction cup, the suction openings of which are arranged in a cylindrical surface, around the cylinder axis, reduced pressure may be applied in a controlled manner to the suction openings one after the other. In this way, reduced pressure may be applied to the at least two suction openings only when they are arranged adjacent to the uppermost slice in the first position, especially applied in a controlled manner depending on the turning position around the cylinder axis.

The suction cup may form a housing, in which the tube is arranged, preferably is shiftably guided on an adjustment device depending on the application of pressured gas to the tube. Preferably, the housing is divisible.

FIG. 1 shows a suction gripper having a suction cup 1 with suction openings 2, which suction cup is connectable to a source of reduced pressure by means of a socket 3. The tube 4 has a beveled opening and projects over the plane of the suction openings 2. The tube 4 is provided with a mechanical stop 5, which preferably projects over the plane of the suction opening 2, for example in a region lying in-between the plane of the suction openings 2 and the rim of the suction cup 1.

The suction cup 1 is connected to a moving device 6, which moves the suction cup 1 into a first position and a second position.

The tube 4 is connected to a source of pressured gas, for example by means of a hose line 7. According to the preferred embodiment, the tube 4 is guided in the suction cup 1. Here it is shown that the tube 4 is arranged between the suction openings 2, alternatively, the tube 4 may be arranged inside a suction opening 2 or project through a suction opening 2. The embodiment shown in FIG. 1 shows a concave suction cup 1, in which four suction openings 2 are arranged.

In the embodiment of FIG. 1 the housing of the suction cup 1 is formed of two parts, which are connectable to each other on closures 8.

The embodiment shown in FIG. 1 has two spring-loaded ejectors 9, which under load in the direction towards the suction cup 1 are loaded against the spring force, so that they load a slice 16, which lies against the ejectors 9, away from the load of the suction cup 1, when the reduced pressure in the suction cup 1 is turned off.

Figure 2:
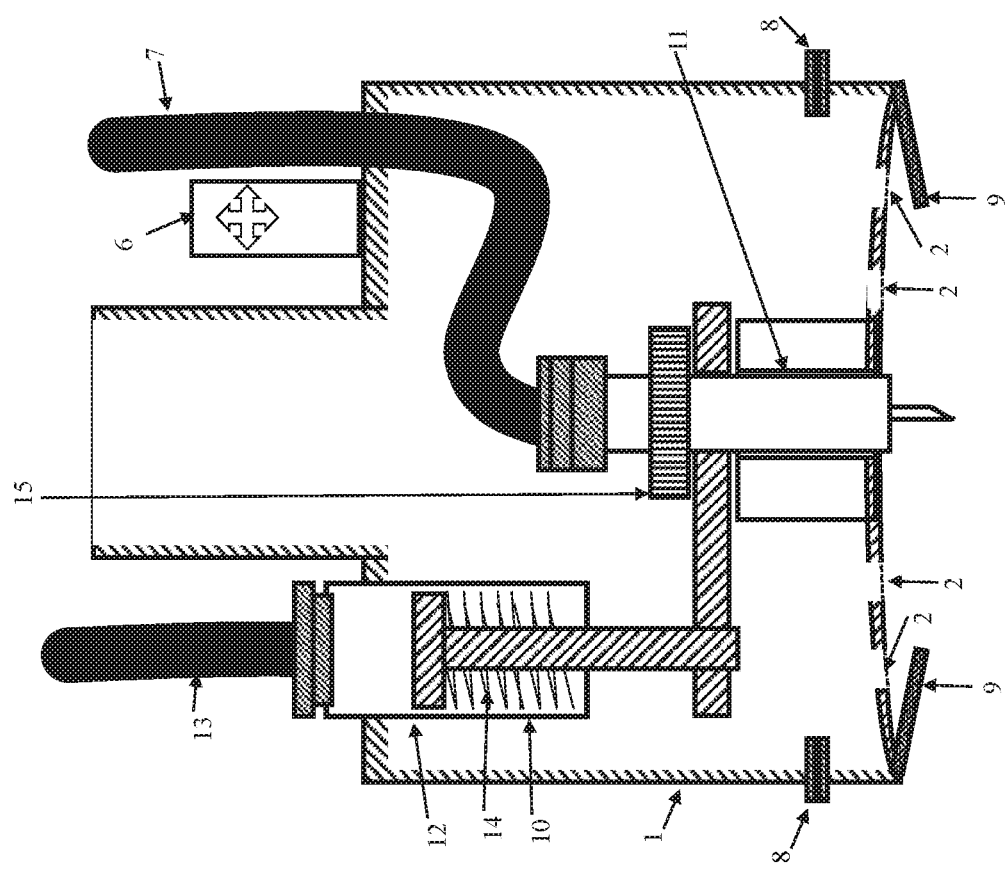
FIG. 2 a cutaway view of an embodiment of a suction gripper.

FIG. 2 shows an embodiment of the suction gripper, in which the ejectors 9 are loaded away from the suction cup 1 by a spring tension, and under load by a slice, which covers the suction cup 1, are pushed against the suction cup 1 or against the suction openings 2.

In this embodiment, the tube 4 is movably guided in a guidance 11 by means of an adjustment device 10, so that the tube 4 is moved in a controlled manner in the direction towards the suction openings 2 by the adjustment device 10, when pressured gas is applied to the tube 4 through the pressured gas duct 7. For this purpose, the adjustment device 10 is provided with a pneumatic cylinder 12, which loads the tube 4 when pressured gas is applied through a pressured gas duct 13, and moves the tube 4 into the suction cup by means of a return spring 14 in the absence of pressured gas. In this embodiment, pressured gas may be applied simultaneously to the pressured gas duct 7 for the tube 4 and the pressured gas duct 13 for the adjustment device 10, so that the tube 4 projects over the suction cup 1 or over the plane of the suction openings 2 only when pressured gas is applied.

The adjusting device 15, schematically shown as a knurled head screw, serves the adjustment of the tube 4 in relation to the suction cup 1, or in relation to the planes of the suction openings 2.

As shown in FIG. 2, the ejectors 9 may pivotably be arranged against a suction opening 2, so that a slice sucked-in to the suction cup 1 does not directly lie against one of several suction openings 2, but against an ejector 9, which may be sucked against one of several suction openings 2 when reduced pressure is applied to the suction cup 1.

The FIGS. 3A-3C show, from the left (FIG. 3A) to the right (FIG. 3B), steps of the process, in which a suction cup 1 rests with the rim of its suction opening 2 on the uppermost slice 16 of a stack of slices. In the suction cup 1, of which a cutaway view is shown, the suction opening 2 is covered by a grid behind the plane of the suction opening 2, against which grid the slice 16 may be pulled.

In the process shown herein, the tube 4 projects over the plane of the suction opening 2 and is pushed through the uppermost slice 16, until the ending of the tube 4 is arranged approximately in the interspace between the uppermost slice 16 and the adjacent slice. The application to the tube 4 leads, FIG. 3B, to a partial separation or spacing of the uppermost slice 16 from the adjacent slice lying underneath. By application of reduced pressure to the suction cup 1 in one of the stages of FIG. 3A or 3B, the uppermost slice 16 is sucked against the suction opening 2, so that according to FIG. 3C the suction cup 1 may be moved from the first position away from the stack of slices when reduced pressure is applied.

Figures 4A, 4B:
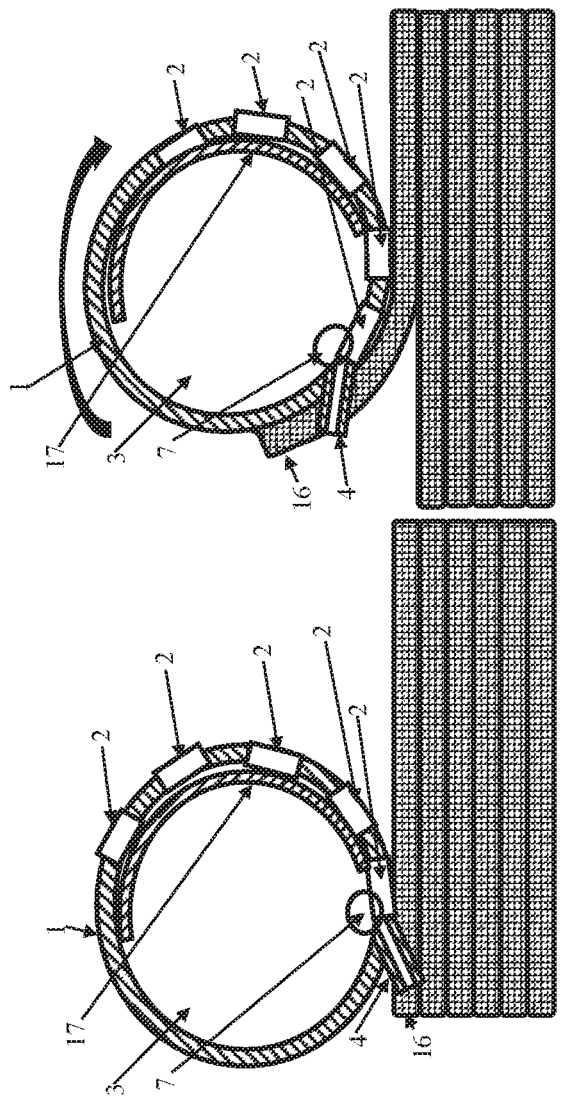
FIGS. 4A-4B a cutaway view of a further embodiment of a suction gripper.

The FIGS. 4A and 4B show an embodiment, in which the suction openings 2 are arranged in a convex suction cup 1 having a cylinder form. The suction cup 1 is rotatable and movable along the first position in a controlled manner, in which the suction cup 1 lies against the uppermost slice 16, so that during a rotation around the cylinder axis and a movement along the slice 16 the suction openings 2 contact the slice 16 one after another without relative movement. The tube 4 may be subject to the application with pressured gas through a pressured gas duct 7 and projects over the suction cup 1 up into the interface layer, where the slice 16 contacts the next adjacent slice.

Reduced pressure is applied to the suction openings 2 one after the other by a valve device 17, for example in the form of a cover, around which the suction cup 1 is rotatable, releasing the suction openings 2 one after the other, depending on the rotation of the suction cup 1.

REFERENCE NUMERALS

1 suction cup
2 suction opening
3 socket for low pressure source
4 tube
5 mechanical stop
6 moving device
7 pressured gas duct
8 closure
9 ejector
10 adjustment device
11 guidance
12 pneumatic cylinder
13 pressured gas duct
14 return spring
15 adjusting device
16 slice
17 valve device

The invention claimed is:

1. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of a slice, wherein the suction gripper is adapted such that during application of pressured gas to the tube, by means of an adjusting device the tube is movable into a position in which the ending of the tube projects over the plane of the suction opening, and in the absence of the application of pressured gas the tube is movable back from this position.

2. The suction gripper according to claim 1, wherein the tube projects over the plane of the suction opening by 0.2 to 10 mm.

3. The suction gripper according to claim 1, wherein the ending of the tube is bevelled.

4. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of a slice, further comprising a moving device, which the suction cup is mounted on, and which is controlled to move the suction cup into a first position and subsequently into a second position, and by a control unit, which is adapted to apply pressured gas to the tube and to apply reduced pressure to the suction cup, when the suction cup is in a first position, to apply reduced pressure to the suction cup until a second position is reached, and to remove the applied reduced pressure in the second position.

5. The suction gripper according to claim 4, characterized in that the control unit is adapted not to apply pressured gas to the tube during movement of the suction cup from the first position.

6. The suction gripper according to claim 4, wherein the control unit is adapted to apply pressured gas to the tube and to subsequently apply reduced pressure to the suction cup with a time delay.

7. The suction gripper according to claim 4, wherein the control unit is adapted to apply reduced pressure to the suction cup and to subsequently apply pressured gas to the tube with a time delay.

8. The suction gripper according to claim 4, wherein the tube has a mechanical stop in the plane of the suction opening and projects over the mechanical stop by the thickness of at least one or exactly one slice.

9. The suction gripper according to claim 4, having a carrier for carrying a stack of slices, wherein the carrier is arranged in a first position and the second position is spaced apart therefrom.

10. The suction gripper according to claim 4, wherein the control unit is adapted to apply pressured gas to the tube in the first position and to subsequently apply reduced pressure to the suction cup.

11. The suction gripper according to claim 4, wherein the suction cup has at least two suction openings and is adapted to apply reduced pressure to the suction openings one after the other.

12. The suction gripper according to claim 11, wherein the control unit is adapted to apply reduced pressure to the at least two suction openings depending on the movement of the moving device.

13. The suction gripper according to claim 4, wherein the suction cup is at least partially a cylinder, in the cylinder wall of which the at least one suction opening is arranged, wherein the cylinder on the moving device is rotatable around its longitudinal axis, which moving device is adapted to move the cylinder perpendicularly to its longitudinal axis.

14. The suction gripper according to claim 13, wherein the control unit is adapted to apply reduced pressure to the at least two suction openings depending on the rotation of the cylinder.

15. The suction gripper according to claim 4, wherein the tube is movable, during application of pressured gas, into a position by means of an adjusting device, in which position the ending of the tube lies in the plane of the suction opening or projects over the plane of the suction opening, and in the absence of the application of pressured gas the tube is movable back from this position.

16. The suction gripper according to claim 4, further comprising a switch to be operated manually, which is arranged to trigger or control the application of pressured gas to the tube and the application of reduced pressure to the suction cup.

17. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of a slice, further comprising a control unit adapted to apply pressured gas to the tube and to subsequently apply reduced pressure to the suction cup with a time delay.

18. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of a slice, further comprising a control unit adapted to apply reduced pressure to the suction cup and to subsequently apply pressured gas to the tube with a time delay.

19. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of a slice, wherein the tube has a mechanical stop in the plane of the suction opening and projects over the mechanical stop by the thickness of at least one or exactly one slice.

20. The suction gripper according to claim 19, wherein the tube projects over the mechanical stop by 0.2 to 10 mm.

21. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of a slice, having a carrier for carrying a stack of slices, wherein the carrier is arranged in a first position and the second position is spaced apart therefrom.

22. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of slice, further comprising a control unit is adapted to apply pressured gas to the tube in the first position and to subsequently apply reduced pressure to the suction cup.

23. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of slice, wherein the suction cup has at least two suction openings and is adapted to apply reduced pressure to the suction openings one after the other.

24. The suction gripper according to claim 23, characterized in that the control unit is adapted to apply reduced pressure to the at least two suction openings depending on the movement of the moving device.

25. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of slice, wherein the suction cup is at least partially a cylinder, in the cylinder wall of which the at least one suction opening is arranged, wherein the cylinder on the moving device is rotatable around its longitudinal axis, which moving device is adapted to move the cylinder perpendicularly to its longitudinal axis.

26. The suction gripper according to claim 25, characterized in that the control unit is adapted to apply reduced pressure to the at least two suction openings depending on the rotation of the cylinder.

27. A suction gripper for use as a separation device for elastic slices from a stack of slices, comprising: a suction cup with at least one suction opening and having a tube connected in a controlled manner to a source of pressured gas, wherein the suction cup is connected in a controlled manner to a source of reduced pressure, wherein the tube projects over a plane of the suction opening by the thickness of slice, further comprising a switch to be operated manually, which is arranged to trigger or control the application of pressured gas to the tube and the application of reduced pressure to the suction cup.

28. A suction gripper for use as a separation device for elastic slices from a stack of slices, comprising: a suction cup with at least one suction opening and having a tube connected in a controlled manner to a source of pressured gas, which tube projects at least into a plane of the suction opening, wherein the suction cup is connected in a controlled manner to a source of reduced pressure, wherein the suction gripper is controlled to apply pressured gas to the tube and to subsequently apply reduced pressure to the suction cup with a time delay, wherein the suction gripper is adapted such that during application of pressured gas to the tube, by means of an adjusting device the tube is movable into a position in which the ending of the tube projects over the plane of the suction opening, and in the absence of the application of pressured gas the tube is movable back from this position.

29. A suction gripper for use as a separation device for elastic slices from a stack of slices, comprising: a suction cup with at least one suction opening and having a tube connected in a controlled manner to a source of pressured gas, which tube projects at least into a plane of the suction opening, wherein the suction cup is connected in a controlled manner to a source of reduced pressure, wherein the suction gripper is controlled to apply pressured gas to the tube and to subsequently apply reduced pressure to the suction cup with a time delay, further comprising a switch to be operated manually, which is adapted to trigger or control the application of pressured gas to the tube and the application of reduced pressure to the suction cup.

\* \* \* \* \*